(12) United States Patent
Starobin et al.

(10) Patent No.: US 10,349,158 B2
(45) Date of Patent: *Jul. 9, 2019

(54) LOUDSPEAKER SYSTEM (71) Applicant: Sound United, LLC, Vista, CA (US)

(72) Inventors: Bradley M. Starobin, Baltimore, MD (US); Matthew Lyons, York, PA (US); Stuart W. Lumsden, Ruxton, MD (US); Michael DiTullo, Encinitas, CA (US)

(73) Assignee: Sound United, LLC., Vista, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/786,232

(22) Filed: Oct. 17, 2017

(65) Prior Publication Data

US 2018/0041825 A1   Feb. 8, 2018

Related U.S. Application Data

(63) Continuation of application No. 14/873,730, filed on Oct. 2, 2015, now Pat. No. 9,807,484.

(51) Int. Cl.
*H04R 1/02* (2006.01)
*H04R 27/00* (2006.01)
*G06F 3/16* (2006.01)

(52) U.S. Cl.
CPC ............. *H04R 1/026* (2013.01); *G06F 3/162* (2013.01); *H04R 1/028* (2013.01); *H04R 27/00* (2013.01); *H04R 2201/021* (2013.01); *H04R 2201/028* (2013.01); *H04R 2227/005* (2013.01); *H04R 2420/07* (2013.01); *H04R 2430/01* (2013.01)

(58) Field of Classification Search
CPC .............. H04R 1/026; H04R 2201/028; H04R 2201/021; H04R 2420/07; H04R 2430/01; G06F 3/102
See application file for complete search history.

(56) References Cited

U.S. PATENT DOCUMENTS

| 8,446,737 | B1 | 5/2013 | Tschirpke |
| 9,196,432 | B1 | 11/2015 | O'Keeffe |
| 9,807,484 | B2 | 10/2017 | Starobin et al. |
| 2002/0002039 | A1* | 1/2002 | Qureshey ........... G06Q 30/0641 455/344 |
| 2003/0062990 | A1* | 4/2003 | Schaeffer, Jr. ........... H04B 3/54 375/259 |
| 2017/0099534 | A1 | 4/2017 | Starobin et al. |

* cited by examiner

*Primary Examiner* — Sunita Joshi
(74) *Attorney, Agent, or Firm* — McAndrews, Held & Malloy, Ltd.

(57) ABSTRACT

A loudspeaker system and method of utilizing and/or installing thereof. As a non-limiting example, various aspects of this disclosure provide a loudspeaker system that may be conveniently integrated with a power distribution network of a premises.

25 Claims, 8 Drawing Sheets

LOUDSPEAKER SYSTEM

CROSS-REFERENCE TO RELATED APPLICATIONS/INCORPORATION BY REFERENCE

This application is a CONTINUATION of U.S. patent application Ser. No. 14/873,730, titled "Loudspeaker System," and filed on Oct. 2, 2015, which is related to U.S. patent application Ser. No. 14/725,904, titled "Multi-zone Media System and Method for Providing Multi-zone Media," and filed on May 29, 2015; U.S. patent application Ser. No. 14/726,019, titled "System and Method for Providing User Location-based Multi-zone Media," and filed on May 29, 2015; U.S. patent application Ser. No. 14/726,109, titled "System and Method for Selecting and Providing Zone-specific Media," and filed on May 29, 2015; U.S. patent application Ser. No. 14/752,505, titled "System and Method for Integrating a Home Media System and Other Home Systems," and filed Jun. 26, 2015; and U.S. patent application Ser. No. 14/833,723, titled "System and Method for Providing a Quiet Zone," and filed on Aug. 24, 2015; the entire contents of each of which are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Present systems and methods for installing powered loudspeakers in a premises are inadequate, for example resulting in unsightly wiring, costly wall repair, reduction of available power outlets, etc. Further limitations and disadvantages of conventional and traditional approaches will become apparent to one of skill in the art, through comparison of such approaches with the present disclosure as set forth in the remainder of the present application with reference to the drawings.

SUMMARY

Various aspects of this disclosure provide a loudspeaker system and method of utilizing and/or installing thereof. As a non-limiting example, various aspects of this disclosure provide a loudspeaker system that may be conveniently integrated with a power distribution network of a premises.

DETAILED DESCRIPTION OF VARIOUS ASPECTS OF THE DISCLOSURE

The following discussion presents various aspects of the present disclosure by providing various examples thereof. Such examples are non-limiting, and thus the scope of various aspects of the present disclosure should not necessarily be limited by any particular characteristics of the provided examples. In the following discussion, the phrases "for example," "e.g.," and "exemplary" are non-limiting and are generally synonymous with "by way of example and not limitation," "for example and not limitation," and the like.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. Similarly, the term "module" may be utilized herein to refer to a pure hardware module and/or a hybrid hardware/software module (e.g., a processor that operates in accordance with software instructions stored in a memory or other non-transitory medium).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "has," "comprising," "including," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a device may be turned sideways so that its "top" surface is facing horizontally and its "side" surface is facing vertically, without departing from the teachings of the present disclosure.

Various aspects of the present disclosure comprise a loudspeaker system and method of utilizing and/or installing thereof. As a non-limiting example, various aspects of this disclosure provide a loudspeaker system that may be conveniently integrated with a power distribution network of a premises.

The above and other aspects of the present disclosure will be described in or be apparent from the following description of various example implementations. The discussion herein will refer to a variety of illustrative drawings. Such drawings are generally simplified to provide examples of various aspects of the disclosure. It should be understood that any or all of the features of a drawing may be incorporated into any other drawing.

Figure 1:
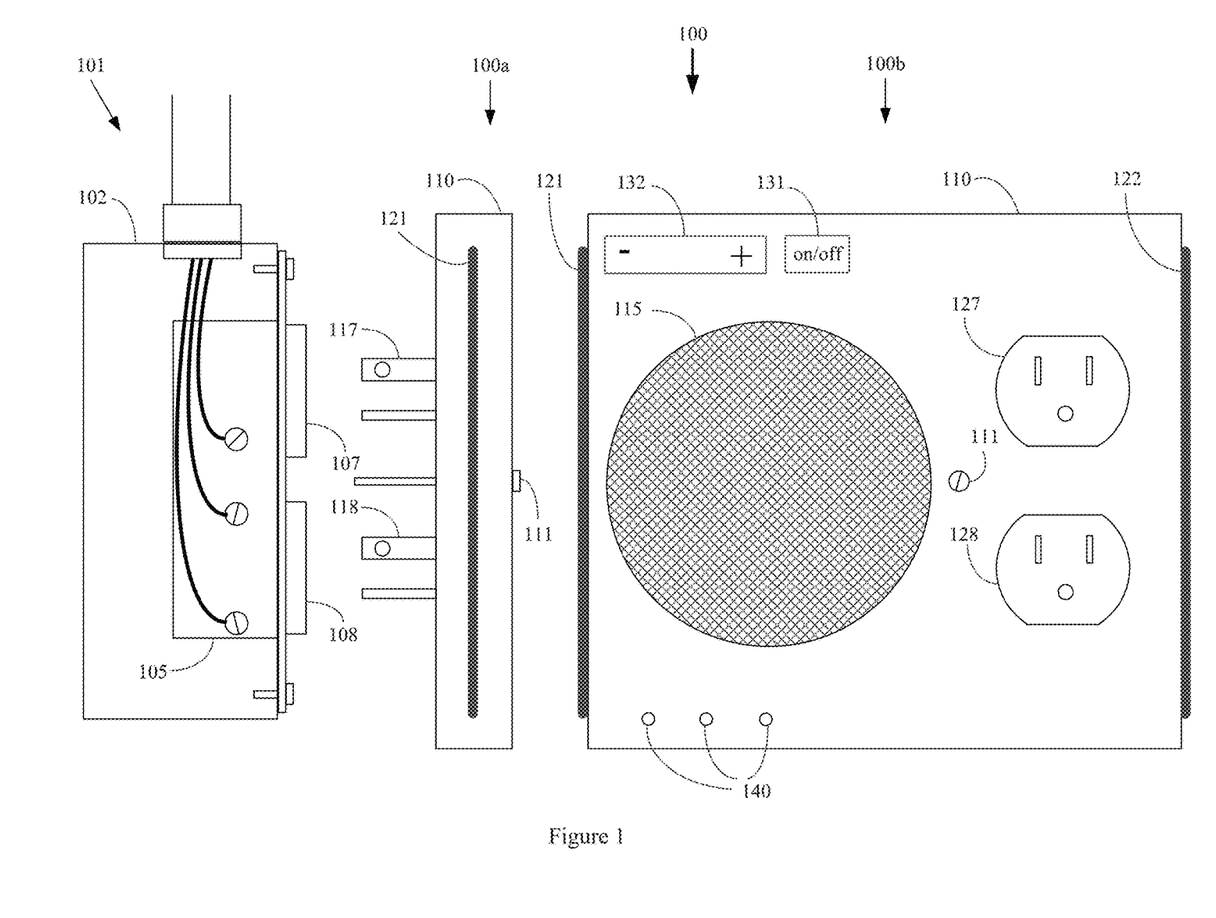
FIG. 1 is a diagram of an example loudspeaker system comprising a power outlet, in accordance with various aspects of the present disclosure.

FIG. 1 is a diagram of an example loudspeaker system comprising a power outlet, in accordance with various aspects of the present disclosure. The example loudspeaker system 100 may, for example, share any or all characteristics with any or all of the other example loudspeaker systems presented herein (e.g., with regard to FIGS. 2-8).

FIG. 1 shows an electrical junction box 102 of a premises (e.g., a home, office, campus, outdoor area, garage, etc.). The electrical junction box 102 may, for example, be utilized for the distribution and/or control of electrical power. The junction box 102 shown in FIG. 1 comprises an electrical outlet 105 attached thereto (e.g., mechanically attached with screws) and wired in accordance with the relevant electrical codes. The electrical outlet 105, in turn, may comprise an upper power plug receptacle 107 and a lower power plug receptacle 108. As shown in FIG. 1, a face plate that would generally cover the cavity of the junction box 102 is not present (e.g., has been removed, was not installed, etc.). Note that in other example implementations, the face plate may be present, and the loudspeaker system 100 installed over the face plate.

FIG. 1 also shows a loudspeaker system 100, from a side view 100a and a front view 100b. Referring to the side view 100a, the example loudspeaker system 100 comprises an enclosure 110. The enclosure 110 may, for example, comprise any of a variety of enclosure characteristics. For example, the enclosure 110 may be formed of molded plastic and have a backing formed of plastic, cardboard, metal, etc.

The example loudspeaker system 100 comprises an upper electrical plug 117 and a lower electrical plug 118. In an example implementation, the upper electrical plug 117 and the lower electrical plug 118 may be configured (e.g., sized, positioned, oriented, etc.) to mate with the upper power plug receptacle 107 and the lower power plug receptacle 108 of the electrical outlet 105. For example, though various example implementations discussed herein may comprise the loudspeaker system 100 connected directly to the electrical wiring in the junction box 102, the example implementation shown in FIG. 1 may be conveniently plugged into an existing electrical outlet (e.g., replacing the face plate, or in addition to the face plate). For example, the loudspeaker system 100 (or a back plate thereof) may have the form factor of a junction box wall plate. Also for example, the loudspeaker system 100 (or a back plate thereof) may have a form factor larger than a junction box wall plate, while comprising an attachment form function of a junction box wall plate. In other words, though the loudspeaker system 100 may be larger than a junction box wall plate, the loudspeaker system 100 (or a back plate thereof) may comprise attachment features that match the junction box.

The side view 100a also shows a first antenna 121. As discussed herein in more detail, the loudspeaker system 100 may comprise wireless communication capability, for example for communication with one or more sources of audio content, one or more destinations for sensor content, etc. To enhance wireless connectivity, the loudspeaker system 100 may comprise one or more antennas. The antenna(s) may be internal to the enclosure 110 and/or may be external to the enclosure 110. The example loudspeaker system 100 is shown in FIG. 1 with an external antenna 121. The antenna 121 may, for example, be attached to the enclosure 110 or may be integrated with the enclosure 110. The antenna 121 may, for example, comprise a stand-alone antenna, a strip of conductive tape, a strip of conductive plastic or other material integrated with the enclosure 110, etc.

The side view 100a also shows an attachment screw 111. The attachment screw 111 may be configured (e.g., sized, positioned, oriented, etc.) to mate with a center threaded hole of the outlet 105 and/or of the junction box 102. Note that although the attachment screw 111 (and other attachment screws discussed herein) is shown as being accessible on the front of the enclosure 110, this need not be the case. For example, the attachment screw 111 (and other attachment screws discussed herein) may be accessible at a back panel (or back plate) of the enclosure 110 to which the rest of the enclosure 110 may be attached (e.g., by slide mounting, snap fitting, hanging, etc.). For example, any of the attachment screw configurations discussed herein may be incorporated in a back panel and/or incorporated into an adapter fixture formed to mate with both the junction box and the loudspeaker system.

The front view 100b shows a loudspeaker 115 that outputs audio based on an audio signal communicated to the loudspeaker system 100. The loudspeaker 115 may comprise any of a variety of characteristics. For example, the loudspeaker 115 may comprise a relatively flat profile to minimize the extent to which the enclosure 110 extends from a wall. As a non-limiting example, the loudspeaker 115 may, for example, comprise characteristics of a thin loudspeaker as disclosed in U.S. Pat. No. 5,148,493 to Bruney et al., the entire contents of which are hereby incorporated herein by reference. Though only one loudspeaker 115 is shown, the loudspeaker system 100 may comprise a plurality of loudspeakers.

The example loudspeaker system 100 also comprises an upper power plug receptacle 127 and a lower power plug receptacle 128. The upper power plug receptacle 127 may, for example, be directly connected to the upper power plug receptacle 107 of the electrical outlet 105 (e.g., via one or more electrical conductors, for example electrical plates or prongs, electrical wires, etc.). Similarly, the lower power plug receptacle 128 may, for example, be directly connected to the lower power plug receptacle 108 of the electrical outlet 105. Note that the upper power plug receptacle 127 and the lower power plug receptacle 128 may be horizontally and/or vertically aligned, respectively, with the upper power plug receptacle 107 and the lower power plug receptacle 108, but need not be. As shown in FIG. 1, for example as evidenced by the attachment screw 111 horizontally offset from the power plug receptacles 127 and 128, the power plug receptacles 127 and 128 of the example loudspeaker system 100 are horizontally offset from the power plug receptacles 107 and 108 of the electrical outlet 105. Such a configuration need not be the case however. For example, the attachment screw may, for example, be horizontally and/or vertically centered on the enclosure.

As mentioned above, the loudspeaker system 100 may comprise one or more antennas. The example front view 100b shows a first antenna 121 (e.g., a left antenna) and a second antenna 122 (e.g., a right antenna). In accordance with various wireless communication technologies, multiple antennas may be utilized to enhance wireless communication (e.g., utilizing antenna diversity, multiple-input-multiple-output (MIMO) communication, etc.). In an example implementation, for example in an example utilizing IEEE 802.11 2.4 GHz communication, the first antenna 121 and the second antenna 122 may be separated by about 5 inches or more. In another example implementation, for example in an example implementation utilizing IEEE 802.11 5 GHz communication, the first antenna 121 and the second antenna 122 may be separated by 2.5 inches or more. Note that additional antennas (not shown) may be included inside of the enclosure 110. In an example implementation, the loudspeaker system 100 may comprise from one to four antennas. Also as explained herein, the loudspeaker system 100 may be capable of communicating in accordance with a plurality of different wireless protocols (e.g., Wi-Fi, Bluetooth, UWB, near field, etc.). In such a scenario, the loudspeaker system 100 may comprise a plurality of different types of antennas.

Note that depending on the orientation in which the loudspeaker system 100 will be mounted (e.g., to a junction box), the position and/or orientation of the antennas (e.g., the antennas 121 and 122) may change in relation to the enclosure 110. For example, in a scenario in which the loudspeaker system 100 will be mounted in a sideways orientation (e.g., to a sideways oriented junction box), the antennas may be rotated about the enclosure, for example so that antenna polarization may be maintained as desired.

As discussed herein, the loudspeaker system 100 may comprise any of a variety of user interface features. As non-limiting examples, the front view 100b of the example loudspeaker system 100 shows a user pushbutton switch 131 (e.g., a hard or soft switch) by which a user may turn the loudspeaker on or off. Also, the front view 100b shows a volume control feature 132 (e.g., a slide switch, a plus/minus hard or soft switch, a touch pad, touch screen, etc.) by which a user may control audio volume of the loudspeaker system 100. Though only two example user interface features are shown, as discussed herein, any number of user interface features may be provided (e.g., on/off input, audio volume control, audio source control, system reset, light dimming control, connectivity and/or networking control, state indicating LEDs, etc.

As discussed herein, the loudspeaker system 100 may comprise any of a variety of sensors. The example loudspeaker system 100 may, for example, comprise a plurality of ports 140 that couple sensors internal to the enclosure 110 to the environment outside of the enclosure 110. For example, in an example implementation in which the example loudspeaker 100 provides voice control capability and/or utilizes sound feedback, at least one of the ports 140 may provide an opening through which sound may flow to a microphone positioned within the enclosure 110. Such a microphone may, for example, be positioned within the enclosure 110 and sound-isolated from the loudspeaker 115. Other types of sensors that may, for example, benefit from the ports 140 may comprise a motion detection sensor, an environmental sensor (e.g., a temperature sensor, a humidity sensor, a pressure sensor, a gas or particle sensor, etc.), etc.

The attachment screw 111 may, for example, be generally horizontally centered on the enclosure 110 but need not be. The example implementation shown in FIG. 1 may, for example, be configured for attachment to a single outlet junction box (e.g., with threaded attachment hole horizontally and/or vertically centered on the junction box 102). Note, however, that any of a variety of attachment screw configurations may be utilized, for example depending on the characteristics of the junction box to which the loudspeaker system is to be attached. For example, as shown elsewhere herein, a dual junction box may comprise two or two sets of attachment holes, etc.

Figure 2:
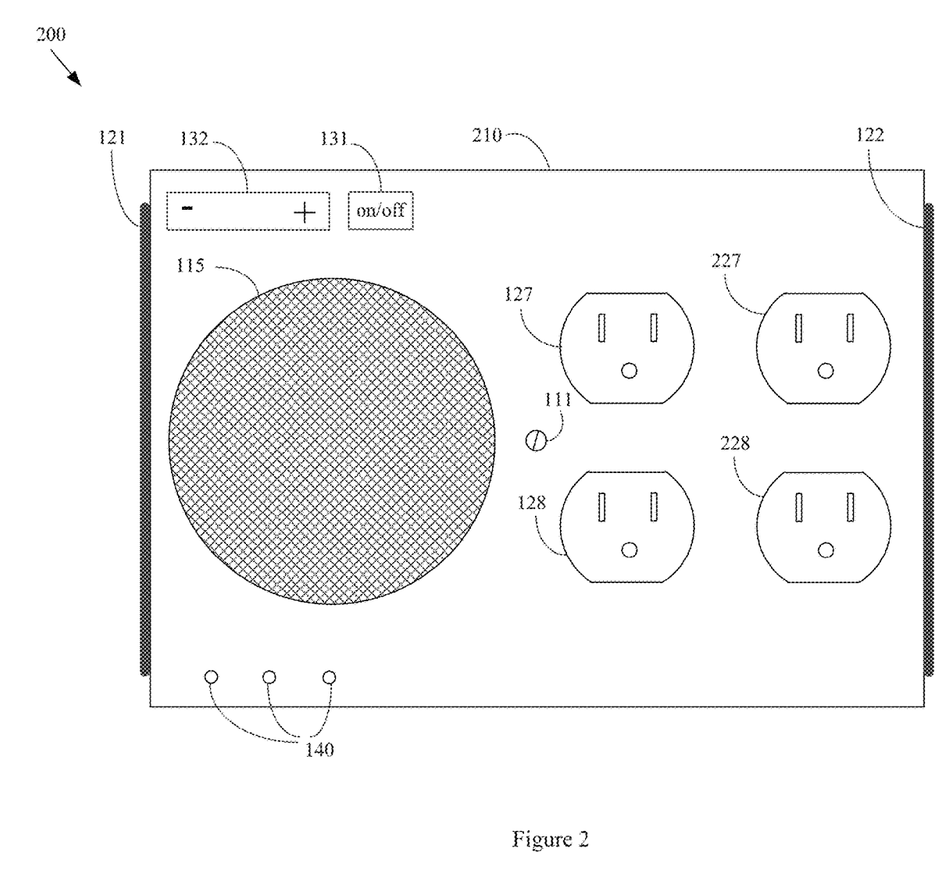
FIG. 2 is a diagram of an example loudspeaker system comprising a plurality of power outlets, in accordance with various aspects of the present disclosure.

Referring now to FIG. 2, such figure shows a diagram of an example loudspeaker system 200 comprising a plurality of power outlets (or power plug receptacles), in accordance with various aspects of the present disclosure. The example loudspeaker system 200 may, for example, share any or all characteristics with any or all of the other example loudspeaker systems presented herein (e.g., with regard to FIGS. 1 and 3-8). The discussion of the example loudspeaker system 200 will focus on differences between the example loudspeaker system 200 and the example loudspeaker system 100 of FIG. 1 and/or other example loudspeaker systems presented herein.

The example loudspeaker system 200 may be coupled to a single-outlet junction box, but may expand the electrical connectivity of the single-outlet junction box to multiple outlets. For example, instead of two power plug receptacles (e.g., as shown in the example loudspeaker system 100 of FIG. 1), the example loudspeaker system 200 comprises two additional power plug receptacles, in particular the top right power plug receptacle 227 and the bottom right power plug receptacle 228. Note that, as with the example loudspeaker system 100 shown in FIG. 1, the example loudspeaker system 200 comprises an attachment screws 111 that mates with a center attachment hole of the outlet 105. Note that depending on whether the loudspeaker system 200 or any loudspeaker system disclosed herein is attached directly to a junction box or to another device (e.g., an electrical outlet, an electrical switch, an adapter mechanism specifically adapted to mate with the speaker system, etc.), the attachment screw 111 or a plurality thereof may be in any of a variety of locations. In this example, as with the example loudspeaker system 100 shown in FIG. 1, the power plug receptacles of the loudspeaker system 200 (e.g., 127, 128, 227, and 228) are mounted to and/or formed in the enclosure 210.

Note that although the power plug receptacles are generally shown herein on the front face of the example loudspeaker systems, such receptacles may also be located on any one or more of the sides of the loudspeaker systems. For example, in an example implementation, any of the loudspeaker systems presented herein may comprise one or more power receptacles on a bottom surface.

Figure 3:
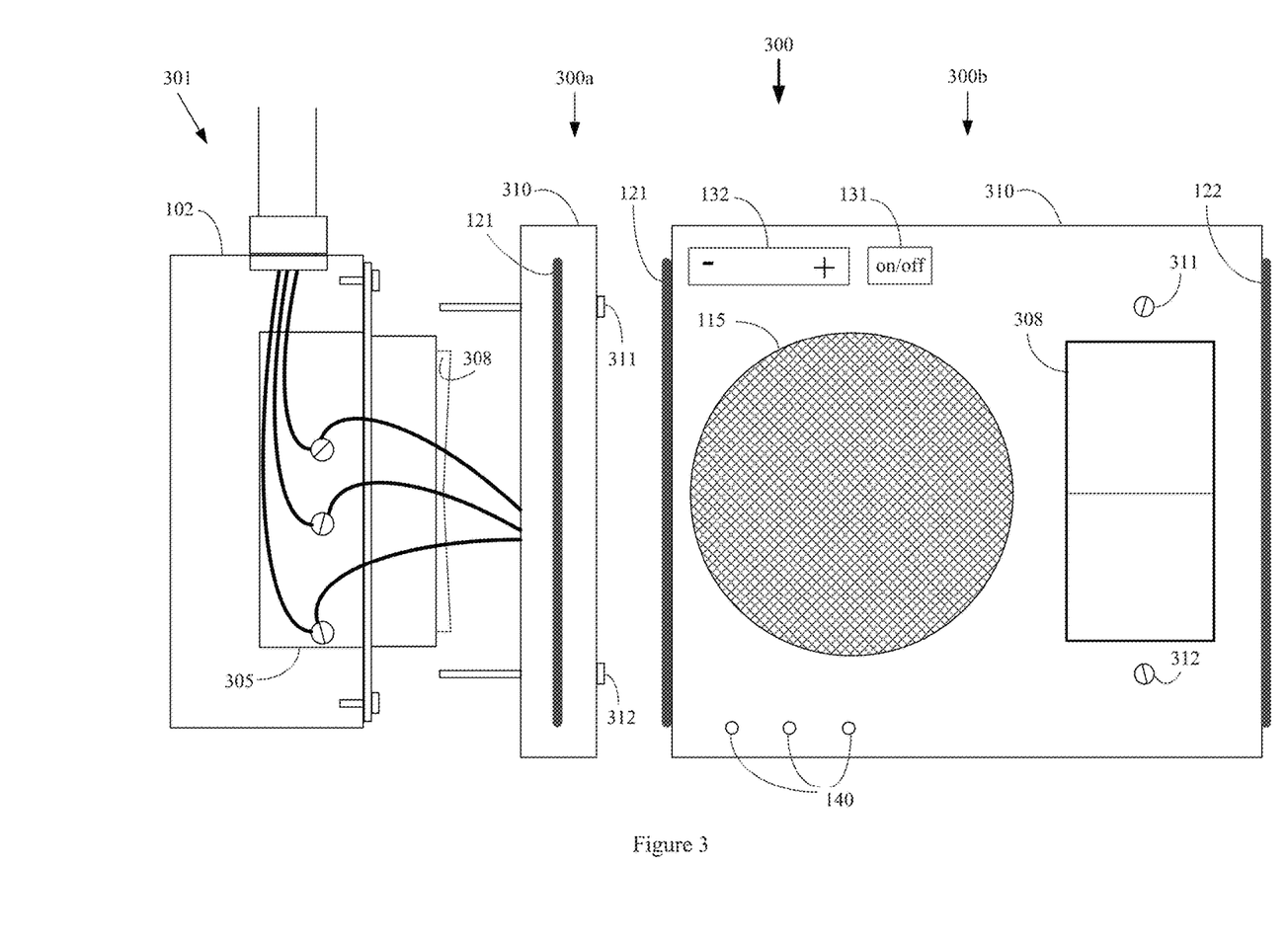
FIG. 3 is a diagram of an example loudspeaker system comprising a power switch, in accordance with various aspects of the present disclosure.

A loudspeaker system in accordance with various aspects of the present closure may provide power switching (or control) instead of or in addition to power receptacle functionality. FIG. 3 is a diagram of an example loudspeaker system 300 comprising a power switch, in accordance with various aspects of the present disclosure. The example loudspeaker system 300 may, for example, share any or all characteristics with any or all of the other example loudspeaker systems presented herein (e.g., with regard to FIGS. 1-2 and 4-8). The discussion of the example loudspeaker system 300 will focus on differences between the example loudspeaker system 300 and the example loudspeaker system 100 of FIG. 1 and/or other example loudspeaker systems presented herein.

The junction box 102 is shown with an electrical power switch 308 (e.g., a light switch, a power outlet switch, etc.) mounted thereto and wired to the electrical power system of a premises. The electrical power switch 308 may comprise any of a variety of characteristics. For example, the electrical power switch 308 may comprise a hard toggle or rocker switch, a soft switch, a touch pad, a plurality of soft switches, etc. In an example implementation that is not illustrated, the power switch 308 may be of a standard size. In such an example implementation, the enclosure 110 may have a relatively thin portion (e.g., having a thickness on the order of a general wall plate for a junction box) through which the power switch 308 may protrude, or alternatively comprise a uniform thickness having such characteristics. In the example implementation shown in FIG. 3, however, the electrical switch 308 has an enhanced height (e.g., ¼", ⅜", ½", etc.) such that the electrical switch 308 may extend through an enclosure 310 that is thicker than a general junction box wall plate. In this example implementation, wires of the loudspeaker system 300 are also coupled to terminals of the power switch 308 to draw power for the loudspeaker system 300 (e.g., to a Power Supply Module 720 discussed herein).

Note that in this case, the attachment screws 311 and 312 are positioned as they would be in a general wall plate covering a single-switch junction box. In other words, the attachment screws 311 and 312 are horizontally centered on the power switch 308 that is protruding through the enclosure 310. Also note that in an example scenario that includes power plug receptacles, instead of or in addition to a power switch, such power plug receptacles may also be extended in the same manner as the power switch 308 to extend through the loudspeaker system enclosure.

As discussed herein, rather than (or in addition to) being mounted over an existing power outlet or power switch, a loudspeaker system in accordance with various aspects of the present disclosure may comprise its own outlet(s) and/or switch(es). An example is provided at FIG. 4, which shows a diagram of an example loudspeaker system 400 comprising a power switch, in accordance with various aspects of the present disclosure. The example loudspeaker system 400 may, for example, share any or all characteristics with any or all of the other example loudspeaker systems presented herein (e.g., with regard to FIGS. 1-3 and 5-8). The discussion of the example loudspeaker system 400 will focus on differences between the example loudspeaker system 400 and the example loudspeaker system 100 of FIG. 1 and/or other example loudspeaker systems presented herein.

The example loudspeaker system 400 comprises a power switch 427. In the example implementation shown in FIG. 4, the power switch 427 comprises connection terminals that, when the system 400 is mounted to the junction box 102, will be positioned within the cavity of the junction box 102. Note that the switch 427 may, but need not, protrude from the back side of the enclosure 410 as shown.

Figure 4:
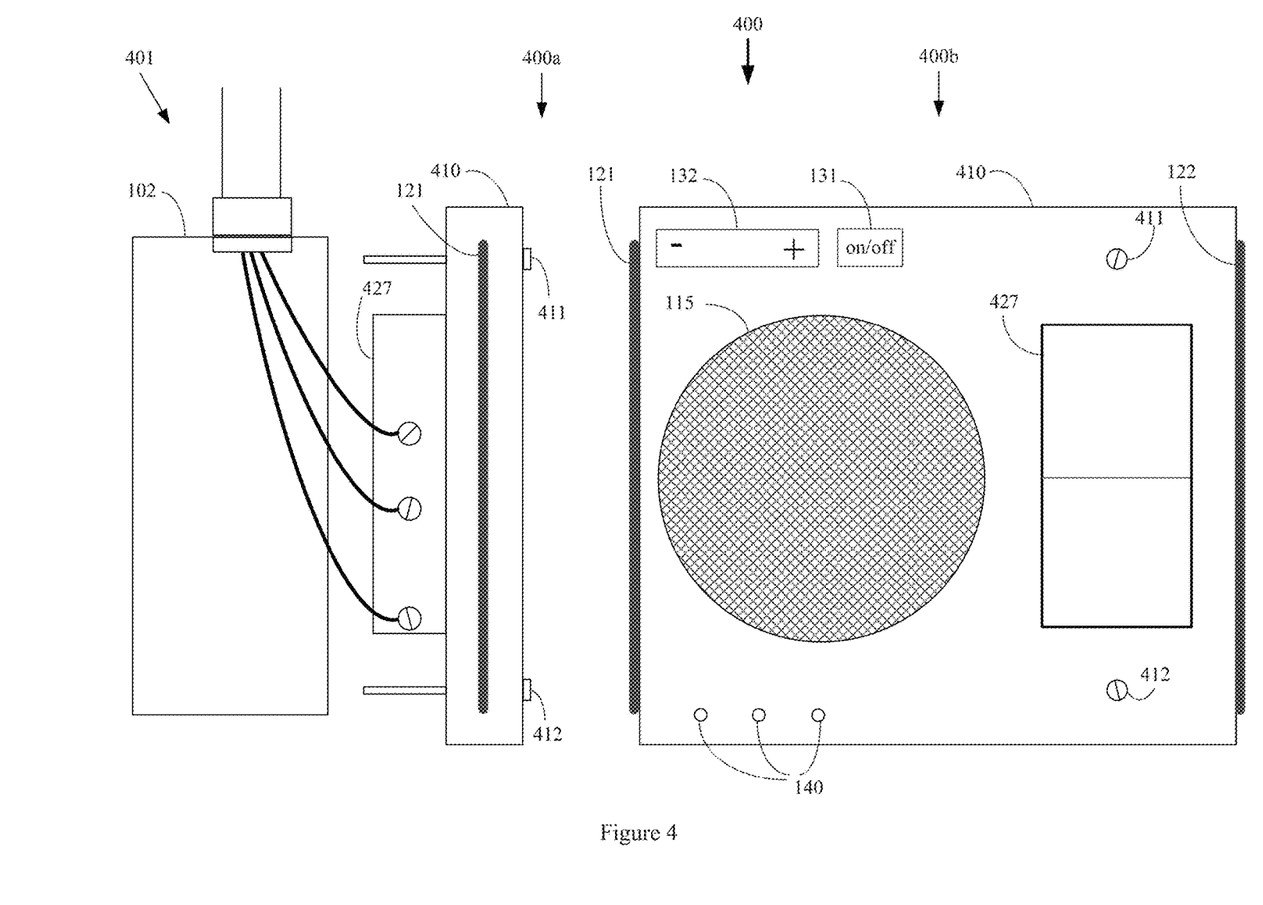
FIG. 4 is a diagram of an example loudspeaker system comprising a power switch, in accordance with various aspects of the present disclosure.

The connection screws 411 and 412 of the example loudspeaker system 400 may, for example, be configured to mate with threaded attachment holes of the junction box 102. Since a separate outlet or switch might not be present within the junction box 102, there might not be mating holes of such outlet or switch to utilize for attachment.

In the example shown in FIG. 4, since the switch 427 protrudes from the back of the enclosure 410, the switch 427 may be generally centered in the junction box 102. Accordingly, as shown in the front view 400b, the attachment screws 411 and 412 are aligned horizontally with the switch 427. Note that such horizontal alignment is an example and non-limiting. For example, the attachment screws may be horizontally displaced from the switch 427, so long as portions of the loudspeaker system 400 that are designed to protrude into the junction box are allowed to do so.

Figure 5:
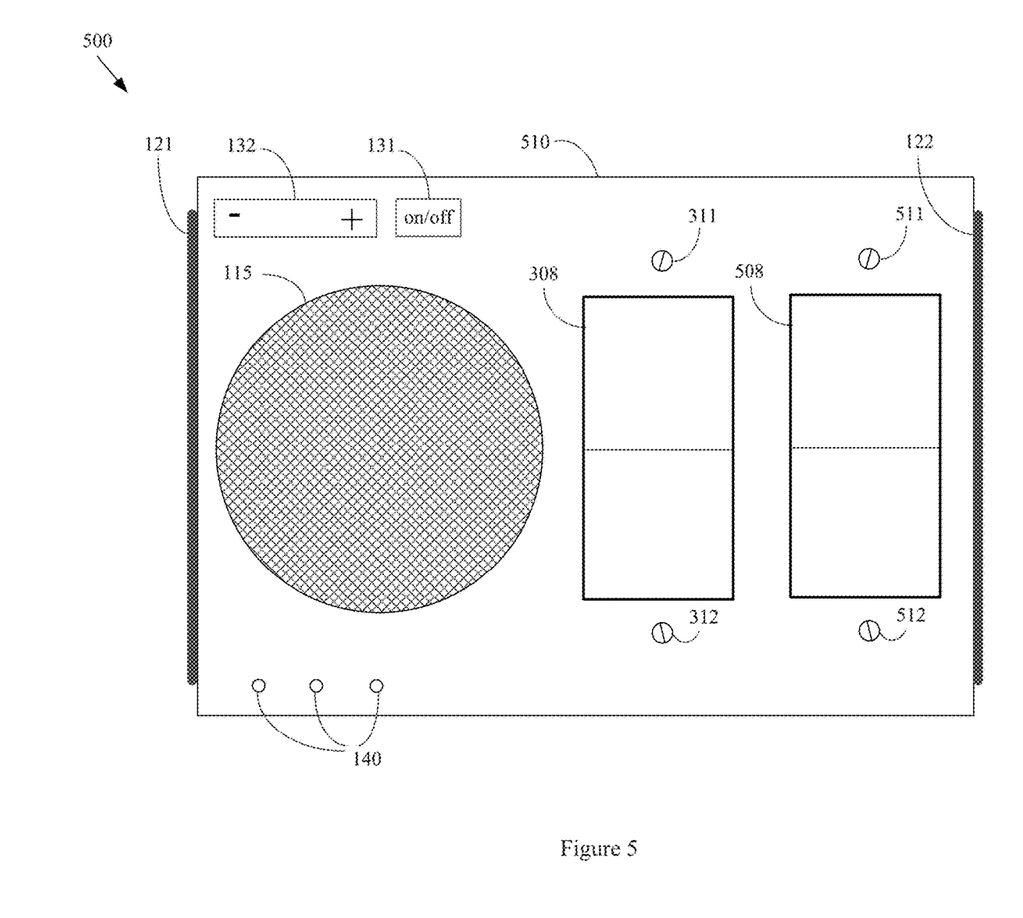
FIG. 5 is a diagram of an example loudspeaker system comprising a plurality of power switches, in accordance with various aspects of the present disclosure.

Various example loudspeaker systems presented herein are presented in the context of a single-wide junction box. It should be understood that a loudspeaker system in accordance with various aspects of this disclosure may be compatible with any of a variety of different junction box configurations. As an example, FIG. 5 is a diagram of an example loudspeaker system 500 comprising a plurality of power switches, in accordance with various aspects of the present disclosure. The example loudspeaker system 500 may, for example, share any or all characteristics with any or all of the other example loudspeaker systems presented herein (e.g., with regard to FIGS. 1-4 and 6-8). The discussion of the example loudspeaker system 500 will focus on differences between the example loudspeaker system 500 and the example loudspeaker system 100 of FIG. 1, the example loudspeaker system 300 of FIG. 3, the example loudspeaker system 400 of FIG. 4, and/or other example loudspeaker systems presented herein.

In addition to a first power switch 308 (e.g., as shown in the example loudspeaker system 300 of FIG. 3) and/or a first power switch 427 (e.g., as shown in the example loudspeaker system 400 of FIG. 4), the example loudspeaker system 500 comprises a second power switch 508. Additionally, the example loudspeaker system 500 comprises a second set of attachment screws 511 and 512 configured to attach to a junction box. In an example implementation, the attachment screws 311, 312, 511, and 512 are configured to attach to respective mating threaded holes in their respective switches. As discussed herein, the power switches 308 and 508 may be power switches separate from the loudspeaker system 500 that extend through the enclosure 510 or may be components of the loudspeaker system 500. Note that, as shown in the example loudspeaker system of FIG. 4, the switches may be an integral part of the loudspeaker system 500. In such case, as shown in FIG. 4, the attachment screws 311, 312, 511, and 512 may be configured to mate with respective threaded holes in the dual junction box.

Figure 6:
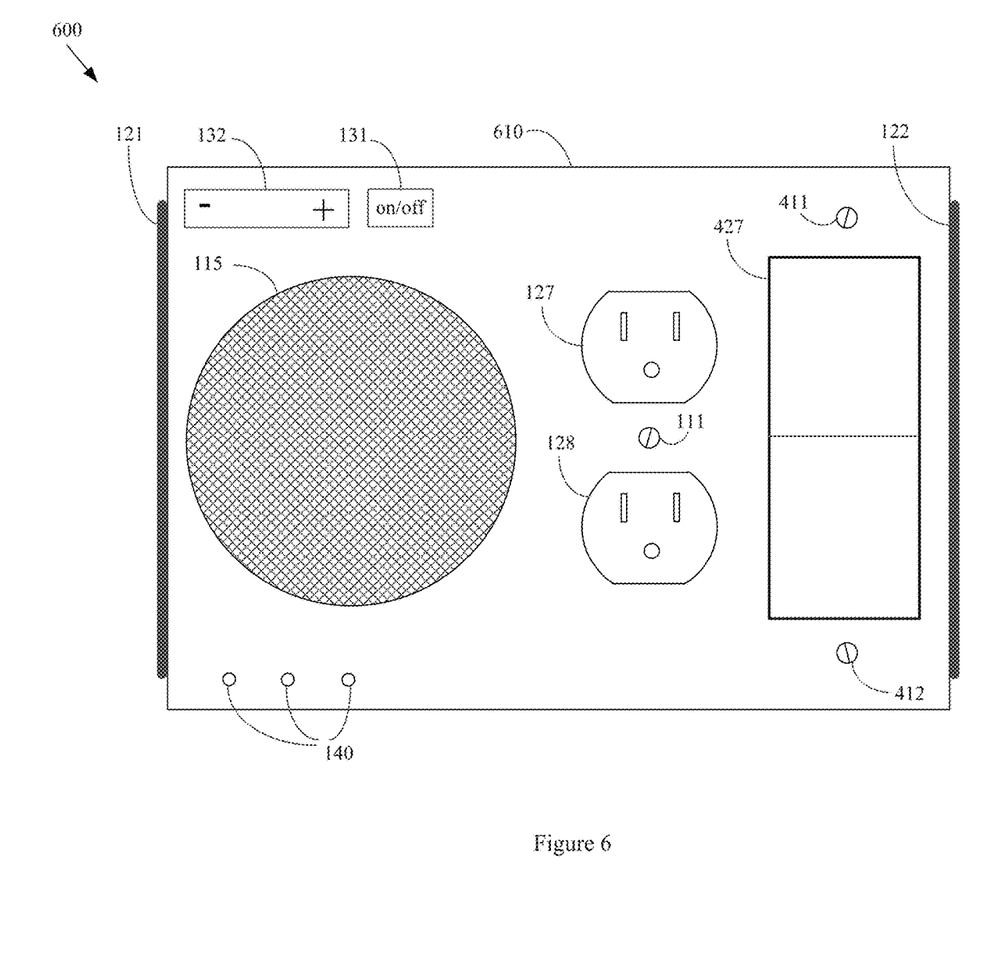
FIG. 6 is a diagram of an example loudspeaker system comprising a power outlet and a power switch, in accordance with various aspects of the present disclosure.

Though the example loudspeaker systems presented to this point have included either electrical outlets or electrical switches, loudspeaker systems in accordance with various aspects of this disclosure may comprise both electrical outlets and electrical switches. FIG. 6 is a diagram of an example loudspeaker system 600 comprising power outlet receptacles 127 and 128 and a power switch 427, in accordance with various aspects of the present disclosure. The example loudspeaker system 600 may, for example, share any or all characteristics with any or all of the other example loudspeaker systems presented herein (e.g., with regard to FIGS. 1-5 and 7-8).

The example power receptacles 127 and 128 may, for example, share any or all characteristics with any other power receptacles disclosed herein. Also for example, the example power switch 427 may share any or all characteristics with any other power switch disclosed herein.

It should be understood that the example loudspeaker systems shown in FIGS. 1-6 are merely examples, and that the scope of this disclosure is not limited by the specific characteristics of such examples. The following discussion will now focus on the operation of various components (e.g., circuits, modules, etc.) of an example loudspeaker system.

Figure 7:
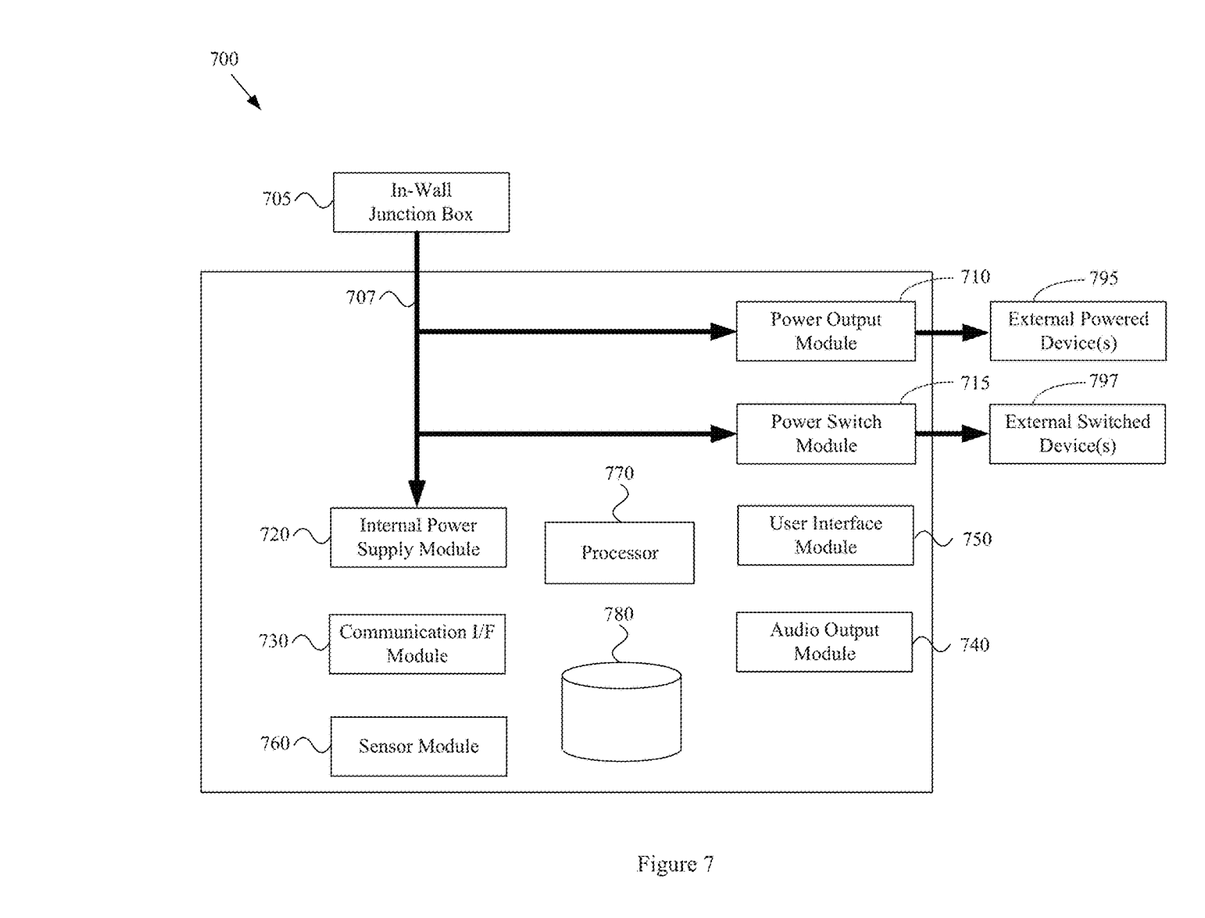
FIG. 7 is a block diagram of an example loudspeaker system, in accordance with various aspects of the present disclosure.

FIG. 7 is a block diagram of an example loudspeaker system 700, in accordance with various aspects of the present disclosure. The example loudspeaker system 700 may, for example, share any or all characteristics with any or all of the example loudspeaker systems discussed herein (e.g., with regard to FIGS. 1-6 and 8). For example, any or all of the modules discussed with regard to the example loudspeaker system 700 may be incorporated into any or all of the example loudspeakers systems discussed herein (e.g., example loudspeaker systems 100, 200, 300, 400, 500, 600, 816, 821, 831, 841, 851, 861, 871, etc.).

The following discussion will refer to various modules. It should be understood that such modules may be implemented by hardware or by a hardware/software combination. It should also be understood that the scope of this disclosure also extends to a non-transitory computer-readable medium that comprises software instructions that when executed by a processor result in the performance of any or all of the functionality discussed herein.

Additionally, though the discussion herein is segmented into discussion of various modules for the sake of illustrative clarity, it should be understood that the scope of this disclosure should not be limited by arbitrary boundaries between modules. For example, a same hardware component and/or a same software component may be shared between a plurality of modules.

The example loudspeaker system 700 may, for example, comprise an In-Wall Junction Box 705. Various examples of junction boxes are provided herein (e.g., at junction box 102, etc.). The In-Wall Junction Box 705 may comprise any of a variety of characteristics. For example, the In-Wall Junction Box 705 may comprise characteristics of any of a variety of electrical power junction boxes utilized to distribute electrical power (e.g., within a premises, in a garage, outside, on a campus, etc.). For example, the In-Wall Junction Box 705 may comprise a single-wide junction box, a double-wide junction box, etc. Also for example, the In-Wall Junction Box 705 may comprise characteristics of a junction box utilized for networking (e.g., an Ethernet junction box, a telephone junction box, a cable junction box, etc.).

Note that although various examples provided herein are attached to a junction box, the junction box is not necessarily present. For example, in scenarios in which electrical codes allow it, the loudspeaker system 700 may be attached to a wall and connected to a wire within the wall. For example, in an Ethernet example, the loudspeaker system 700 may be mechanically coupled to a wall and electrically coupled to an Ethernet cable, for example over which network communication may occur and via which electrical power may be received. In such a scenario, instead of and/or in addition to an electrical power outlet, the loudspeaker system 700, or an enclosure thereof, may comprise a receptacle for the network (e.g., an Ethernet receptacle, cable television receptacle, telephone receptacle, etc.). Such a receptacle may, for example, be included on a front plate, on a side surface, on a bottom surface, on a top surface, etc., of the loudspeaker system 700.

The example loudspeaker system 700 may, for example, comprise power circuitry 707 that couples (e.g., directly couples) electrical power from the In-Wall Junction Box 705 to various components of the loudspeaker system 700. The power circuitry 707 may, for example, comprise a power bus designed for distribution of 115 VAC power. For example, the power circuitry 707 may comprise metal bars or prongs, power wiring of a compliant gauge, etc.

The example loudspeaker system 700 may comprise a Power Output Module 710. The Power Output Module 710 may, for example, comprise an electrical power outlet and/or one or more power plug receptacles thereof, many examples of which are provided herein (e.g., with regard to the example loudspeaker systems 100, 200, and 600 of FIGS. 1, 2, and 6). For example, the Power Output Module 710 may comprise the same style or configuration of electrical power outlet as that present in the In-Wall Junction Box 705 or present in the In-Wall Junction Box 705 before installation of the loudspeaker system 700. In various example scenarios, the Power Output Module 710 may comprise more power plug receptacles than were present at the In-Wall Junction Box 705 prior to installation of the loudspeaker system 700, thus expanding the overall plug capacity of the In-Wall Junction Box 705. The Power Output Module 710 (e.g., power plug receptacles thereof) may then, for example, provide electrical power to one or more External Powered Devices 795 (e.g., external to an enclosure of the loudspeaker system 700). In an example implementation, the one or more External Powered Devices 795 may plug into the loudspeaker system 700 just as they would plug into a general power receptacle. Note that although not illustrated herein, electrical power outlets of the loudspeaker system 700 (or any loudspeaker system presented herein) may comprise Ground Fault Circuit Interrupter (GFCI) outlets.

Though the Power Output Module 710 is generally presented as a pass-through for electrical power from the In-Wall Junction Box 705 and the power circuitry 707 to the External Power Device(s) 795, it should be understood that the Power Output Module 710 may also manipulate the power signal (e.g., providing filtering, smoothing, amplitude control, fault protection, etc.).

Note that, as explained herein, the power plug receptacles of the Power Output Module 710 may be an integral part of the loudspeaker system 700, but may also be independent power plug receptacles that are merely exposed through openings in the enclosure of the loudspeaker system 700. For example, the loudspeaker system 700 may slide over such independent power plugs, and then electrically connect to such independent power plugs (e.g., as shown in the connection to the switch 308 in FIG. 3).

The example loudspeaker system 700 may comprise a Power Switch Module 715. The Power Switch Module 715 may, for example, comprise an electrical power switch, many examples of which are provided herein (e.g., a light or lamp switch wired directly to a lighting system, a power switch wired to a switched power plug receptacle, etc.). For example, the Power Switch Module 715 may comprise the same style of electrical power switch as that present in the In-Wall Junction Box 705 or present in the In-Wall Junction Box 705 before installation of the loudspeaker system 700. In various example scenarios, the Power Switch Module 715 may comprise more power switches than were present at the In-Wall Junction Box 705 prior to installation of the loudspeaker system 700, thus expanding the switching capacity of the In-Wall Junction Box 705. The Power Switch Module 715 (e.g., power switches thereof) may then, for example, switch electrical power to one or more External Switched Devices 797 (e.g., external to an enclosure of the loudspeaker system 700). In an example implementation, the one or more External Switched Devices 797 may be wired to the loudspeaker system 700 just as they would be wired to an electrical power switch (e.g., an electrical power switch replaced by the loudspeaker system 700). In another example implementation, the one or more External Switched Devices 797 connect to a switched power outlet (or plug receptacle) that is switched by the Power Switch Module 715.

Note that, as explained herein, the power switches of the Power Switch Module 715 may be an integral part of the loudspeaker system 700, but may also be independent power switches that are merely exposed through openings in the enclosure of the loudspeaker system 700.

The example loudspeaker system 700 may also comprise an Internal Power Supply Module 720. The power circuitry 707 that electrically connects to an electrical power source at the In-Wall Junction Box 705 may, for example, provide the electrical power to the Internal Power Supply Module 720. The Internal Power Supply Module 720 may, for example, convert an input power signal received from the power circuitry 707 to a power format (e.g., a desired voltage, desired polarity, etc.) utilized to power various electrical components within the loudspeaker system 700. For example, the Internal Power Supply Module 720 may output one or more power signals utilized by any of a variety of analog and/or digital components of the loudspeaker system 700 (e.g., one or more components of the Communication I/F Module 730, the Sensor Module 760, the User Interface Module 750, the Audio Output Module 740, the Processor 770, the Memory 780, etc.).

The example loudspeaker system 700 may comprise a Communication Interface (I/F) Module 730 that is operable to communicate over any of a variety of communication media and/or in accordance with any of a variety of communication protocols (e.g., standard and/or proprietary protocols). For example, the Communication I/F Module 730 may communicate via one or more wired and/or tethered optical media in accordance with one or more of a variety of wired and/or tethered optical technologies (e.g., Ethernet, cable or MoCA, electrical power infrastructure, phone line, optical cable, etc.). Also for example, the Communication I/F Module 730 may communicate wirelessly in accordance with one or more of a variety of wireless media technologies (e.g., utilizing Wi-Fi, Bluetooth, UWB, near field, cellular, etc.). As discussed herein, the loudspeaker system 700 may comprise one or more antennas coupled to the Communication I/F Module 730.

The Communication I/F Module 730 may, for example, communicate utilizing a plurality of different media and/or protocols. In an example implementation, the Communication I/F Module 730 may communicate with a central audio system controller (e.g., a central source of audio content for a premises) utilizing Wi-Fi (e.g., one or more of the IEEE 802.11 variants), and may communicate with a local source of audio content (e.g., a smart phone, tablet computer, watch, MP3 player, personal computer, etc.) utilizing Bluetooth.

Note that in accordance with any of a variety of communication protocols, the Communication I/F Module 730 may transmit and receive information. For example, as discussed herein, communication between the loudspeaker system 700 and a central controller, with another loudspeaker system, with a local audio source, etc., may generally comprise two-way communication.

Figure 8:
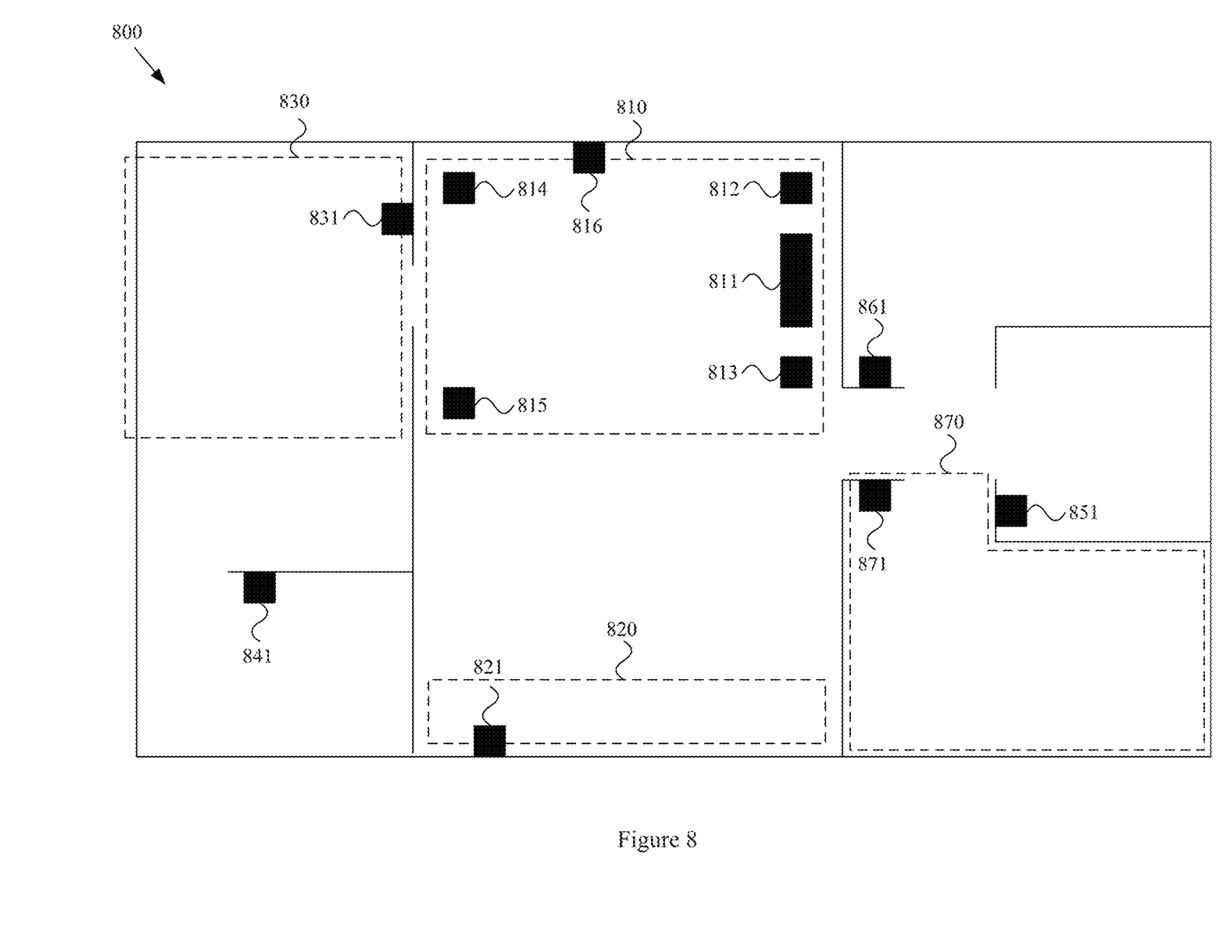
FIG. 8 is a diagram of an example multi-zone media environment, in accordance with various aspects of the present disclosure.

As will be illustrated in FIG. 8, the loudspeaker system 700 may be a component of a larger network, for example a spoke-and-hub network involving a central controller and a plurality of sibling nodes. Also for example, the loudspeaker system 700 may operate as a component of a mesh network (e.g., in accordance with Wi-Fi, Bluetooth, etc.). Additionally for example, the loudspeaker system 700 may operate as a component of a ring network, etc.

The example loudspeaker system 700 may also, for example, comprise an Audio Output Module 740. The Audio Output Module 740 may, for example, receive audio information from the Communication I/F Module 730 and generate sound (e.g., output from one or more speakers of the loudspeaker system 700). For example, the Audio Output Module 740 may receive audio data from the Communication I/F Module 730 encoded in accordance with MP3, convert such audio data into an analog signal to drive a speaker, and provide such analog signal to a speaker of the loudspeaker system 700. Note that the audio content output from the Audio Output Module 740 may comprise characteristics of any of a variety of types of audio content (e.g., music, talk radio, audio portion of a multi-media presentation, alarms or emergency information, telephone conversation, audio output from a home automation system, doorbell sound, noise masking and/or noise cancellation sound, etc.).

In an example scenario in which the audio output comprises audio that follows a user around a premises, the loudspeaker system 700 (and/or controller or other component of the network of which the loudspeaker system 700 is a part) may operate as set forth in U.S. patent application Ser. No. 14/725,904, titled "Multi-zone Media System and Method for Providing Multi-zone Media," and filed on May 29, 2015, the entire content of which is hereby incorporated herein by reference. Similarly, the loudspeaker system 700 (and/or controller or other component of the network of which the loudspeaker system 700 is a part) may operate as set forth in U.S. patent application Ser. No. 14/726,019, titled "System and Method for Providing User Location-based Multi-zone Media," and filed on May 29, 2015, the entire content of which is hereby incorporated herein by reference.

In another example scenario in which the audio output comprises audio that is directed to a particular zone of a premises and/or to a particular user therein, the loudspeaker system 700 (and/or controller or other component of the network of which the loudspeaker system 700 is a part) may operate as set forth in U.S. patent application Ser. No. 14/726,109, titled "System and Method for Selecting and Providing Zone-specific Media," and filed on May 29, 2015, the entire content of which is hereby incorporated herein by reference.

In still another example scenario in which the audio output comprises audio that is associated with communicating with a user in a premises system, the loudspeaker system 700 (and/or controller or other component of the network of which the loudspeaker system 700 is a part) may operate as set forth in U.S. patent application Ser. No. 14/752,505, titled "System and Method for Integrating a Home Media System and Other Home Systems," and filed Jun. 26, 2015, the entire content of which is hereby incorporated herein by reference.

In a further example scenario in which the audio output comprises audio that is utilized for masking and/or cancelling unwanted sound, the loudspeaker system 700 (and/or controller or other component of the network of which the loudspeaker system 700 is a part) may operate as set forth in U.S. patent application Ser. No. 14/833,723, titled "System and Method for Providing a Quiet Zone," and filed on Aug. 24, 2015, the entire content of which is hereby incorporated herein by reference.

The example loudspeaker system 700 may also comprise a User Interface (I/F) Module 750. Various non-limiting examples of user interface features are provided herein (e.g., power on/off switch 131, volume control 132, etc.). The user interface features may comprise any of a variety of characteristics. For example, the user interface features of the example loudspeaker system 700 may comprise a source selection input by which a user may identify a source of audio content to output (e.g., designate a central audio controller of a premises, designate an Internet source, designate a personal electric device such as a smart phone, MP3 player, smart watch, tablet computer, personal computer, etc.). In such a scenario, the Communication I/F Module 730 may operate to receive audio content from the user-designated source. Note that such received audio content may comprise any of a variety of characteristics. For example, the received compressed audio data, decompressed audio data, etc.

In an example implementation, the loudspeaker system 700 (e.g., the User Interface Module 750 and/or Sensor Module 760) may comprise a microphone by which the user may input voice commands to the system 700. As explained herein, the enclosure of the loudspeaker system 700 may comprise a port 140 for the passage of sound through the enclosure to a microphone therein. In an example system implementation in which the loudspeaker system 700 is integrated in a premises system, the User Interface Module 750 may operate to receive user input and communicate such user input with one or more premises systems (e.g., home automation systems, home security systems, home media systems, etc.). An example of such utilization of a microphone may be found in U.S. patent application Ser. No. 14/752,505, titled "System and Method for Integrating a Home Media System and Other Home Systems," and filed Jun. 26, 2015, the entire content of which is hereby incorporated herein by reference.

The User Interface Module 750 may also comprise any of a variety of touch sensors for user input (e.g., soft switches, touch pads, etc.), a touch screen, mechanical push buttons and/or slide controllers, etc.

The example loudspeaker system 700 may also, for example, comprise a Sensor Module 760 that operates to manage any of a variety of sensors incorporated into the loudspeaker system 700. Various functions of the Sensor Module 760 and the User Interface Module 750 may be shared (e.g., as they pertain to sensors related to user interaction). Various sensors of the Sensor Module 760 may, for example, comprise a proximity sensor, any of a variety of environmental sensors (e.g., temperature sensor, gas or particle sensor, moisture or humidity sensor, smoke sensor, vibration sensor, etc.), etc.

In an example scenario in which various sensors of the loudspeaker system 700 (e.g., proximity sensors, microphone sensors, RF signal detectors, vibration sensors, etc.) are utilized to track a user and/or user location, the loudspeaker system 700 (e.g., the Sensor Module 760, Communication I/F Module 730, etc.) may operate as set forth in U.S. patent application Ser. No. 14/726,019, titled "System and Method for Providing User Location-based Multi-zone Media," and filed on May 29, 2015, the entire content of which is hereby incorporated herein by reference; as set forth in U.S. patent application Ser. No. 14/725,904, titled "Multi-zone Media System and Method for Providing Multi-zone Media," and filed on May 29, 2015, the entire content of which is hereby incorporated herein by reference; and as set forth in U.S. patent application Ser. No. 14/726,109, titled "System and Method for Selecting and Providing Zone-specific Media," and filed on May 29, 2015, the entire content of which is hereby incorporated herein by reference.

In still another example scenario in which any of a variety of sensors of the loudspeaker system 700 (e.g., environmental sensors, microphone sensors, etc.) are utilized to provide information to another premises system (e.g., a home automation system, home security system, etc.), the loudspeaker system 700 (e.g., the Sensor Module 760, Communication I/F Module 730, etc.) may operate as set forth in U.S. patent application Ser. No. 14/752,505, titled "System and Method for Integrating a Home Media System and Other Home Systems," and filed Jun. 26, 2015, the entire content of which is hereby incorporated herein by reference.

In yet another example scenario in which one or more microphone sensors may be utilized in an implementation of quiet zone creation in a premises (e.g., as feedback mechanisms, to characterize unwanted sound, etc.), the loudspeaker system 700 (e.g., the Sensor Module 760, Communication I/F Module 730, etc.) may operate as set forth in U.S. patent application Ser. No. 14/833,723, titled "System and Method for Providing a Quiet Zone," and filed on Aug. 24, 2015, the entire content of which is hereby incorporated herein by reference.

The example loudspeaker system 700 may, for example, comprise a processor 770 and a memory 780. Any or all of the functionality or associated modules discussed herein may, for example, be implemented in hardware and/or implemented using a combination of hardware and software (e.g., a processor operating in accordance with software instructions stored on a non-transitory computer-readable medium). For example, the processor 770 may operate in accordance with software instructions stored in the memory 780 to implement all or any part of the modules discussed herein. The processor 770 may, for example, comprise a general-purpose microprocessor, a digital signal processor (DSP), an application specific integrated circuit (ASIC), a microcontroller, etc. The memory 780 may, for example, comprise non-volatile and/or volatile memory. Note that the memory 780 may also be utilized for storing media content, media presentation characteristics, sensor data, user profile information, etc.

The loudspeaker system 700 may, for example, be utilized as a single loudspeaker device, but may also be utilized as part of a larger network, examples of various network utilizations are presented in the applications mentioned above and incorporated herein by reference. FIG. 8 provides an example audio network environment 800 in which a plurality of loudspeaker systems, in accordance with various aspects of the present disclosure, may be integrated.

The example environment 800 comprises a variety of loudspeakers and groups thereof, spaced throughout an example premises (e.g., a home, office, campus, outdoor areas associated therewith, etc.). A campus implementation may, for example, include outdoor areas as well as indoor areas associated with one or more buildings.

The example environment 800 may, for example, comprise a first group of loudspeakers 810. The first group of loudspeakers 810 may, for example, correspond to a first area (or audio zone) of a premises, for example a family room, media room, etc. The first group of loudspeakers 810 may, for example, comprise a central media controller 811. The central media controller 811 may comprise characteristics of any of a variety of central media controllers (e.g., an entertainment center, audio receiver, home media hub, home audio server, general purpose computer operating in accordance with software instructions, an Internet media access point or content server, etc.). The central media controller 811 may generally, for example, manage the presentation of media content throughout the example environment 800. For example, the central media controller 811 may communicate (e.g., transmit and/or receive) audio information, sensor information, etc., with any of the example loudspeaker systems presented herein. Though the example environment 800 is generally shown and discussed as having a central media controller 811, it should be understood that the environment 800 may also operate in a mesh-type or decentralized configuration. For example, as will be discussed herein, any of the media presentation devices (e.g., loudspeaker systems, etc.) discussed herein may perform any or all of the control functionality discussed herein. Also note that the central media controller 811 and/or any of the loudspeakers as disclosed herein may be, or be communicatively coupled with, a content source via the Internet or other network. In an example implementation, the central media controller 811 may process audio content and distribute the audio content to any or all of the loudspeakers. Also note that signal processing for the media content may be generally performed by the central media controller 811, but need not be. For example, the signal processing may be partially or wholly performed by any or all of the loudspeakers presented herein, partially or wholly performed by a remote content server coupled to the central media controller 811 and/or any of the loudspeakers via a network (e.g., a local area network, the Internet, etc.), etc.

The first group of loudspeakers 810 may also, for example, comprise a first (e.g., front left) loudspeaker 812, a second (e.g., front right) loudspeaker 813, a third (e.g., rear left) loudspeaker 814, and a fourth (e.g., rear right) loudspeaker 815. The central media controller 811 may also, for example, comprise a loudspeaker. Each of the first group of loudspeakers 810 may, for example, be operated independently or may be operated as a single group. Each of the first group of loudspeakers 810 may, for example, operate under the control of the central media controller 811 and/or operate autonomously. Note that the designations of the loudspeakers as left, right, front, rear, center, etc. may, but need not, refer to audio spatial arrangements generally synonymous with various loudspeaker arrangements (e.g., stereo, surround sound, monaural, etc.). The first group of loudspeakers 810 also includes a first loudspeaker system 816, which may for example, share any or all characteristics with any of the loudspeaker systems discussed herein. The first loudspeaker system 816 may, for example, be mounted to an electrical output junction box in the first area or zone of a premises.

The example environment 800 may also, for example, comprise a second loudspeaker system 821 in a second area (or audio zone) of a premises, for example a kitchen or dining room, a break room, etc. The loudspeaker system 821 may, for example, share any or all characteristics with any of the loudspeaker systems discussed herein. The second loudspeaker system 821 may, for example, be mounted to an electrical output junction box in the second area. Similarly, the example environment 800 may comprise a third loudspeaker system 831 mounted to a light switch junction box in a third area 830 (e.g., a master bedroom area), a fourth loudspeaker system 841 mounted to a light switch junction box in a fourth area (e.g., a master bathroom), a fifth loudspeaker system 851 mounted to an electrical power junction box in a fifth area (e.g., a guest bathroom), a sixth loudspeaker system 861 mounted to a light switch junction box in a sixth area (e.g., a guest bedroom), and a seventh loudspeaker system 871 mounted to a light switch junction box in a seventh area (e.g., an office). Any of such loudspeaker systems may share any or all characteristics with any of the loudspeaker systems discussed herein (e.g., loudspeaker system 100, 200, 300, 400, 500, 600, 700, etc.).

As discussed herein, the various loudspeaker systems of the example environment 800 may be communicatively coupled with the central controller 811 in a star configuration, communicatively coupled with each other in a mesh configuration, in a ring configuration, etc. Additionally as discussed herein, the various loudspeakers systems (e.g., Communication I/F Modules thereof) may form ad hoc networks with any of a variety of other devices for the communication of audio content, sensor information, control information, etc.

In summary, various aspects of this disclosure provide a loudspeaker system and method of utilizing and/or installing thereof. As a non-limiting example, various aspects of this disclosure provide a loudspeaker system that may be conveniently integrated with a power distribution network of a premises. While the foregoing has been described with reference to certain aspects and embodiments, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular embodiment(s) disclosed, but that the disclosure will include all embodiments falling within the scope of the appended claims.

What is claimed is:

1. A loudspeaker device comprising:
   a front face;
   an electrical power outlet on the front face and adapted to receive an electrical plug of a device external to the loudspeaker device;
   first power circuitry operable to provide first electrical power to the electrical power outlet;
   communication circuitry operable to receive an audio signal from an audio source external to the loudspeaker device;
   audio circuitry operable to generate an audio output based on the received audio signal;
   second power circuitry operable to provide second electrical power to at least the communication circuitry and the audio circuitry; and
   an enclosure that houses at least a portion of the electrical power outlet, the first power circuitry, the communication circuitry, the audio circuitry, and the second power circuitry.

2. The loudspeaker device of claim 1, further comprising an electrical power plug protruding from a back side of the enclosure.

3. A loudspeaker device comprising:
a front face;
an electrical power outlet on the front face and adapted to receive an electrical plug of a device external to the loudspeaker device;
first power circuitry operable to provide first electrical power to the electrical power outlet;
communication circuitry operable to receive an audio signal from an audio source external to the loudspeaker device;
audio circuitry operable to generate an audio output based on the received audio signal;
second power circuitry operable to provide second electrical power to at least the communication circuitry and the audio circuitry; and
an enclosure that comprises the front face, a back side, and lateral sides that extend between the front face and the back side, and wherein the loudspeaker device is configured such that at least a portion of the lateral sides protrude from a premises wall when the loudspeaker device is mounted.

4. The loudspeaker device of claim 1, wherein the first power circuitry comprises electrical power wires protruding from a back side of the enclosure.

5. The loudspeaker device of claim 1, wherein the enclosure is adapted to be mounted to a junction box of a premises-based electrical power distribution system.

6. A loudspeaker device comprising:
a front face;
an electrical power outlet on the front face and adapted to receive an electrical plug of a device external to the loudspeaker device;
first power circuitry operable to provide first electrical power to the electrical power outlet;
communication circuitry operable to receive an audio signal from an audio source external to the loudspeaker device;
audio circuitry operable to generate an audio output based on the received audio signal;
second power circuitry operable to provide second electrical power to at least the communication circuitry and the audio circuitry; and
an antenna coupled to the communication circuitry and positioned to be outside of a premises wall when the loudspeaker device is mounted.

7. The loudspeaker device of claim 1, comprising a manual electrical power switch on the front face and adapted to switch electrical power to a device that is independent of the loudspeaker device.

8. The loudspeaker device of claim 1, wherein the communication circuitry comprises wireless communication circuitry.

9. A loudspeaker device comprising:
a front face;
an electrical power outlet on the front face and adapted to receive an electrical plug of a device external to the loudspeaker device;
first power circuitry operable to provide first electrical power to the electrical power outlet;
communication circuitry operable to receive an audio signal from an audio source external to the loudspeaker device;
audio circuitry operable to generate an audio output based on the received audio signal; and
second power circuitry operable to provide second electrical power to at least the communication circuitry and the audio circuitry,
wherein the first power circuitry is operable to receive the first electrical power from a premises-based electrical power distribution system and directly pass the received first electrical power to the electrical power outlet.

10. The loudspeaker device of claim 9, wherein the second power circuitry is operable to:
receive the second electrical power from the premises-based electrical power distribution system; and
convert the received second electrical power to a form compatible with the communication circuitry and the audio circuitry.

11. A loudspeaker device comprising:
a front face;
a manual electrical power switch on the front face and adapted to switch electrical power to a device that is independent of the loudspeaker device;
first power circuitry operable to provide first electrical power to the manual electrical power switch;
communication circuitry operable to receive an audio signal from an audio source external to the loudspeaker device;
audio circuitry operable to generate an audio output based on the received audio signal; and
second power circuitry operable to provide second electrical power to at least the communication circuitry and the audio circuitry; and
an antenna coupled to the communication circuitry and positioned to be outside of a premises wall when the loudspeaker device is mounted.

12. The loudspeaker device of claim 11, further comprising a back side, and an electrical power plug protruding from the back side.

13. A loudspeaker device comprising:
a front face;
a manual electrical power switch on the front face and adapted to switch electrical power to a device that is independent of the loudspeaker device;
first power circuitry operable to provide first electrical power to the manual electrical power switch;
communication circuitry operable to receive an audio signal from an audio source external to the loudspeaker device;
audio circuitry operable to generate an audio output based on the received audio signal;
second power circuitry operable to provide second electrical power to at least the communication circuitry and the audio circuitry; and
an enclosure that comprises the front face, a back side, and lateral sides that extend between the front face and the back side, and wherein the loudspeaker device is configured such that at least a portion of the lateral sides protrude from a premises wall when the loudspeaker device is mounted.

14. A loudspeaker device comprising:
a front face;
a manual electrical power switch on the front face and adapted to switch electrical power to a device that is independent of the loudspeaker device;
first power circuitry operable to provide first electrical power to the manual electrical power switch;
communication circuitry operable to receive an audio signal from an audio source external to the loudspeaker device;
audio circuitry operable to generate an audio output based on the received audio signal;

second power circuitry operable to provide second electrical power to at least the communication circuitry and the audio circuitry; and an enclosure that houses at least a portion of the manual electrical power switch, the first power circuitry, the communication circuitry, the audio circuitry, and the second power circuitry, and wherein the enclosure is adapted to be mounted to a junction box of a premises-based electrical power distribution system.

15. The loudspeaker device of claim 11, wherein the antenna comprises a strip that is internal to the enclosure.

16. The loudspeaker device of claim 11, wherein the manual electrical power switch protrudes from the front face.

17. A loudspeaker device comprising:
a front face;
a manual electrical power switch on the front face and adapted to switch electrical power to a device that is independent of the loudspeaker device;
first power circuitry operable to provide first electrical power to the manual electrical power switch;
communication circuitry operable to receive an audio signal from an audio source external to the loudspeaker device;
audio circuitry operable to generate an audio output based on the received audio signal; and
second power circuitry operable to provide second electrical power to at least the communication circuitry and the audio circuitry;
wherein the first power circuitry is operable to receive the first electrical power from a premises-based electrical power distribution system and directly pass the received first electrical power to the electrical power switch.

18. The loudspeaker device of claim 17, wherein the second power circuitry is operable to:
receive the second electrical power from the premises-based electrical power distribution system; and
convert the received second electrical power to a form compatible with the communication circuitry and the audio circuitry.

19. A loudspeaker device comprising:
an enclosure configured to be mounted to an electrical power junction box of a premises-based electrical power distribution system;
communication circuitry operable to receive an audio signal from an audio source external to the loudspeaker device;
audio circuitry operable to generate an audio output based on the received audio signal;
power circuitry operable to provide electrical power to at least the communication circuitry and the audio circuitry; and
an antenna exposed from the enclosure and positioned to be outside of a premises wall when the enclosure is mounted to the electrical power junction box.

20. The loudspeaker device of claim 19, wherein:
the enclosure comprises a front face, a back side, and a plurality of lateral sides that extend between the front face and the back side; and
the antenna is positioned on at least one of the lateral sides.

21. The loudspeaker device of claim 19, comprising an electrical outlet adapted to receive an electrical plug of a device external to the loudspeaker device.

22. The loudspeaker device of claim 19, comprising an electrical power plug protruding from a side of the enclosure and adapted to plug into a premises-based electrical power outlet.

23. The loudspeaker device of claim 22, wherein the power circuitry is operable to:
receive the electrical power from the premises-based electrical power outlet; and
convert the received electrical power to a form compatible with the communication circuitry and the audio circuitry.

24. The loudspeaker device of claim 19, wherein the enclosure comprises a front face, a back side, and lateral sides that extend between the front face and the back side, and wherein the loudspeaker device is configured such that at least a portion of the lateral sides protrude from a premises wall when the loudspeaker device is mounted.

25. The loudspeaker device of claim 19, wherein the antenna comprises a strip.

* * * * *